United States Patent

Ashizawa

[11] Patent Number: 5,869,918
[45] Date of Patent: Feb. 9, 1999

[54] ACTUATOR WHICH CONTROLS VOLTAGE LEVEL AND VOLTAGE LEVEL INCREASE TIME OF AN ELECTROMECHANICAL CONVERTING ELEMENT DRIVE SIGNAL

[75] Inventor: Takatoshi Ashizawa, Kawasaki, Japan

[73] Assignee: Nikon Corporation, Tokyo, Japan

[21] Appl. No.: 954,856

[22] Filed: Oct. 21, 1997

Related U.S. Application Data

[63] Continuation of Ser. No. 518,392, Aug. 15, 1995, abandoned.

[30] Foreign Application Priority Data

Aug. 24, 1994 [JP] Japan ..................................... 6-199822

[51] Int. Cl.$^6$ .................................................... H01L 41/08
[52] U.S. Cl. .......................... 310/328; 310/323; 310/321; 310/329
[58] Field of Search .................... 310/328, 321, 310/323, 329; 248/636, 638

[56] References Cited

U.S. PATENT DOCUMENTS 4,894,579  1/1990  Higuchi et al. ......................... 310/328

FOREIGN PATENT DOCUMENTS 4-207982  of 1992  Japan .
0 727 4543 A  10/1995  Japan .
0 727 4544 A  10/1995  Japan .

Primary Examiner—Mark O. Budd
Assistant Examiner—Timothy A. Williams

[57] ABSTRACT

An actuator which includes an electromechanical converting element having a first connection portion and a second connection portion, an inertia member connected to the first connection portion of the electromechanical converting element, and a moving member connected to the second connection portion of the electromechanical converting element. A drive signal control unit produces a drive signal having an asymmetric voltage waveform. The asymmetric voltage waveform has a voltage level increasing portion in which the voltage level of the asymmetric voltage waveform is increasing. The drive signal control unit controls the voltage level of the asymmetric voltage waveform during the voltage level increasing portion of the asymmetric voltage waveform, and applies the drive signal to the electromechanical converting element to generate an inertia force in the inertia member and cause the moving member to move. Alternatively, the drive signal control unit can control the amount of time of the voltage level increasing portion of the asymmetric voltage waveform, or the drive signal control unit can control both the voltage level and the amount of time of the voltage level increasing portion of the asymmetric voltage waveform.

21 Claims, 7 Drawing Sheets

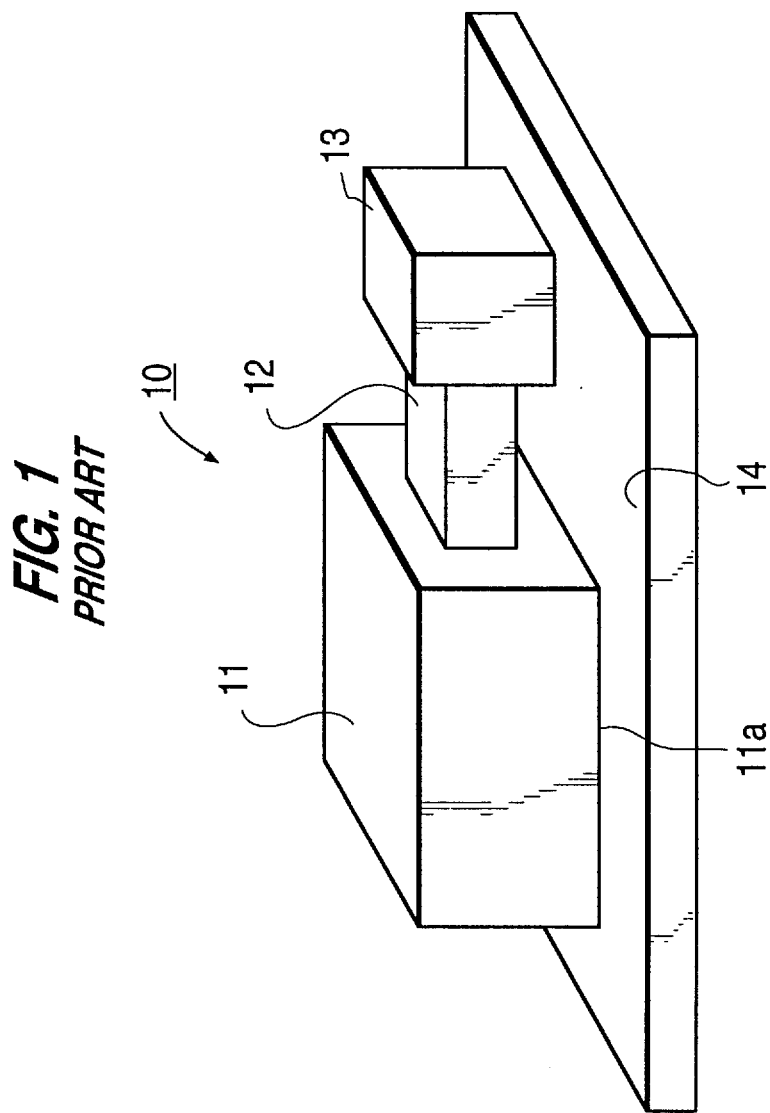

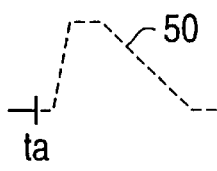
FIG. 2(A)
PRIOR ART
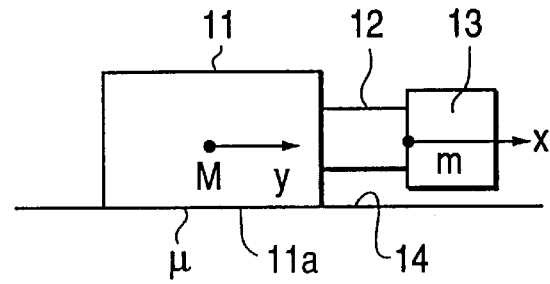
FIG. 2(B)
PRIOR ART
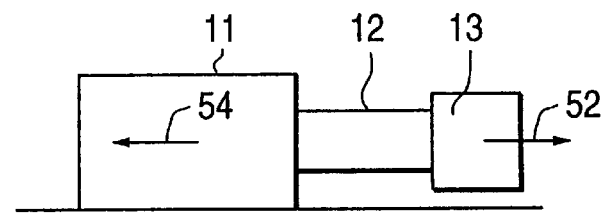
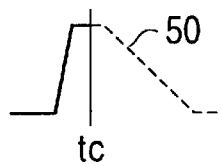
FIG. 2(C)
PRIOR ART
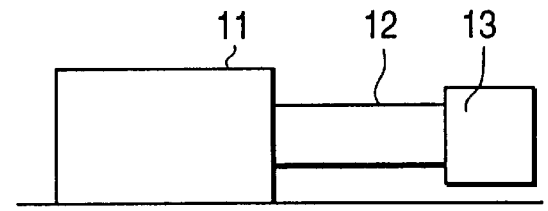
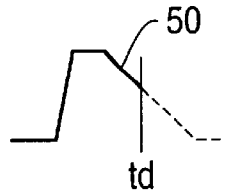
FIG. 2(D)
PRIOR ART
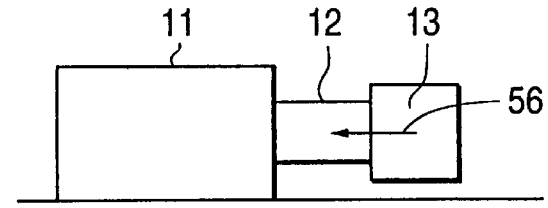
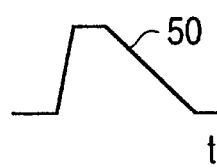
FIG. 2(E)
PRIOR ART
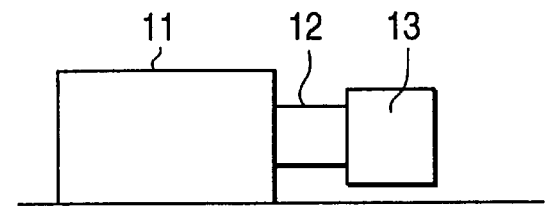

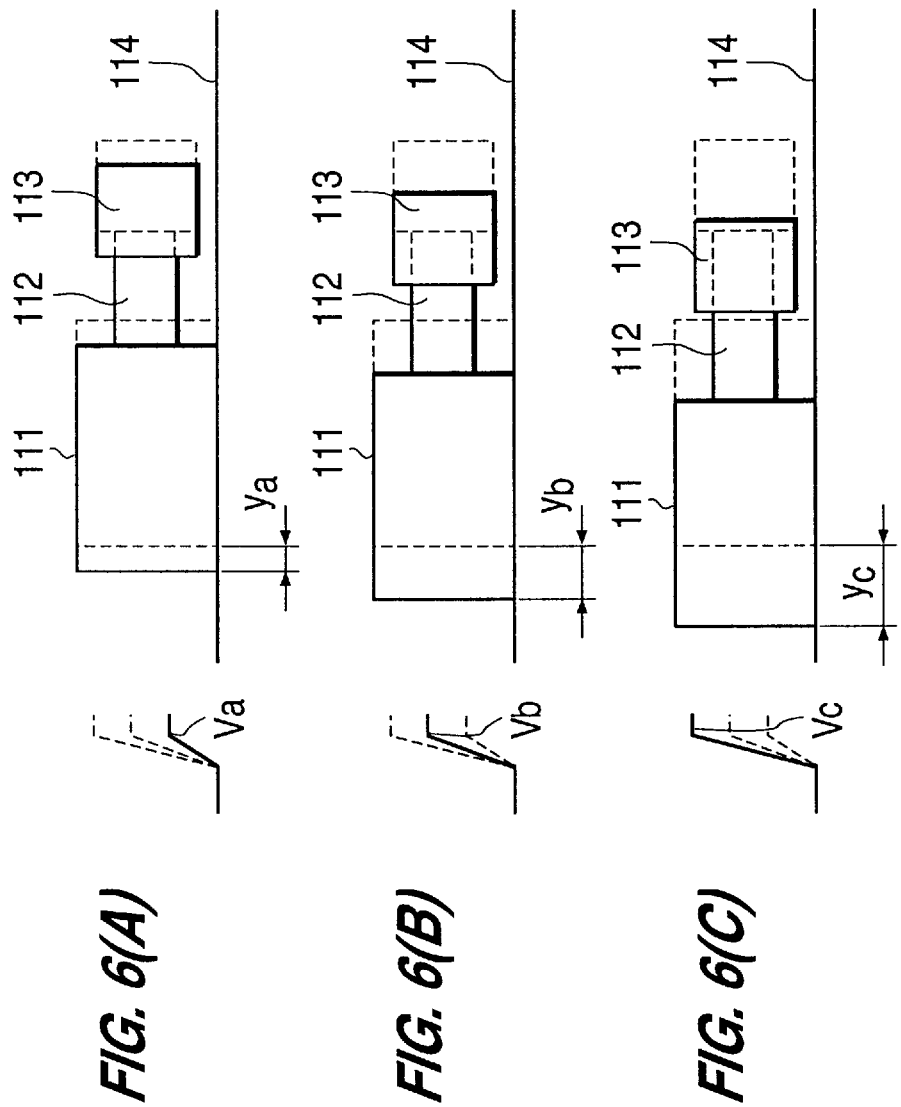

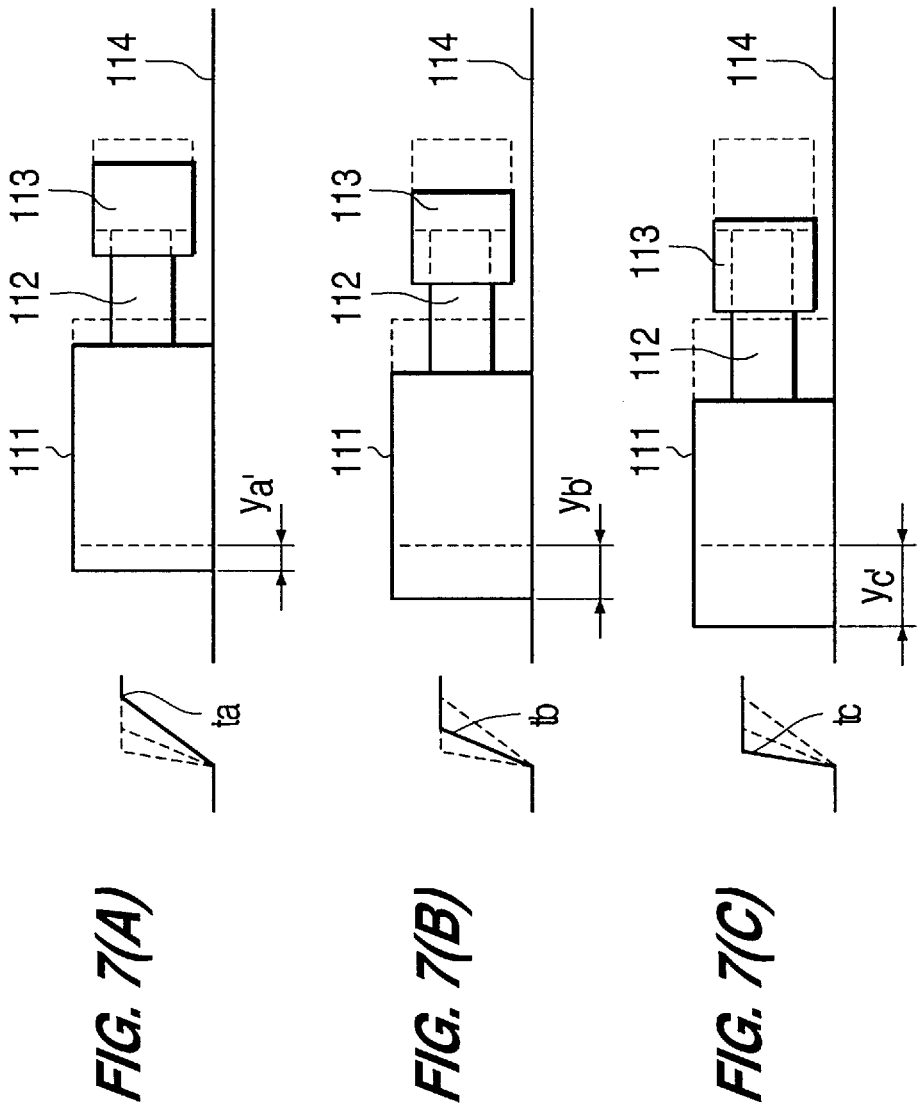

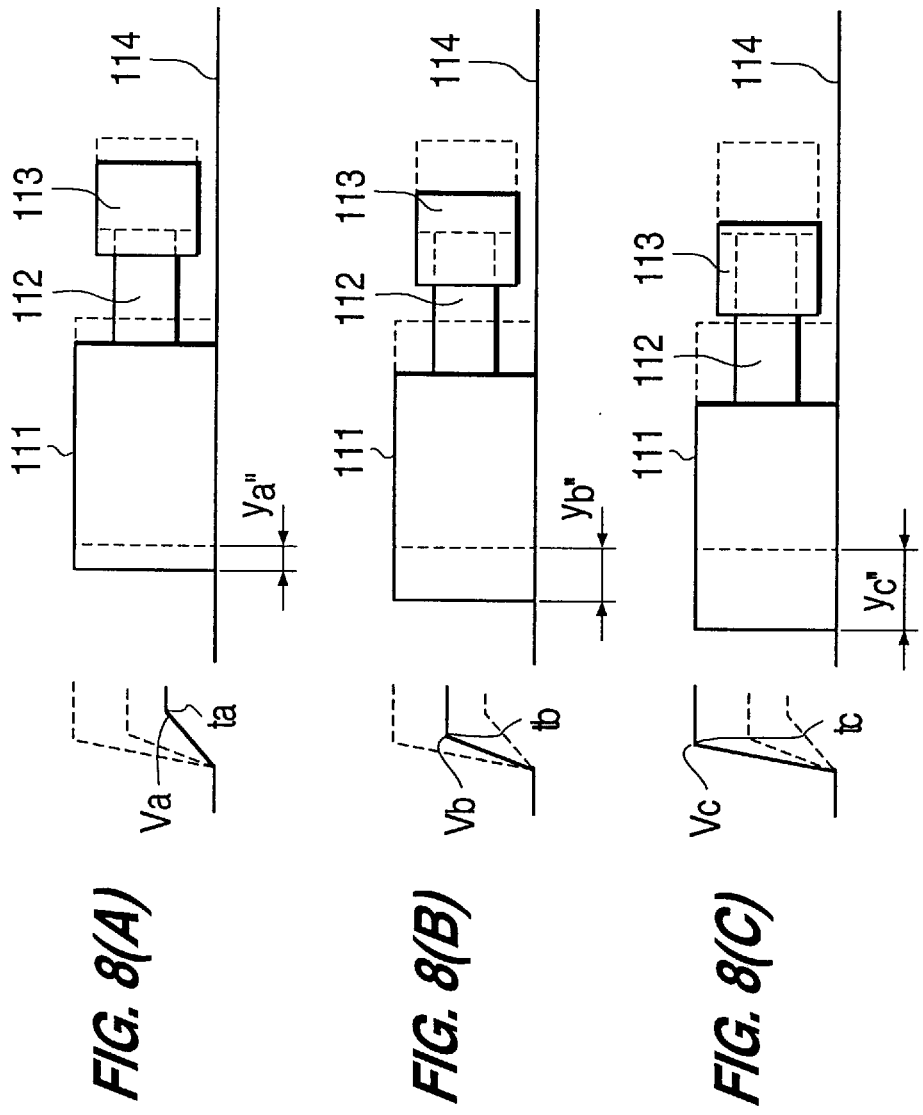

ACTUATOR WHICH CONTROLS VOLTAGE LEVEL AND VOLTAGE LEVEL INCREASE TIME OF AN ELECTROMECHANICAL CONVERTING ELEMENT DRIVE SIGNAL

This application is a continuation, of application Ser. No. 08/518,392, filed Aug. 15, 1995, now abandoned.

BACKGROUND OF THE INVENTION

1. Field of the Invention

The present invention is related to a piezoelectric actuator having an electromechanical converting element which moves a moving member by utilizing inertia force from an inertia member. More particularly, the present invention is related to the control of a drive signal for driving the electromechanical converting element of the piezoelectric actuator.

2. Description of the Related Art

FIG. 1 (prior art) is a diagram illustrating a conventional piezoelectric actuator. Such a convention piezoelectric actuator is disclosed, for example, in Japanese Laid-Open Patent Publication Number Sho 63-299785. Referring now to FIG. 1, a piezoelectric actuator 10 includes a moving member 11 and an inertia member 13, with a piezoelectric member 12 therebetween. Piezoelectric member 12 has one end mounted to moving member 11 and another end mounted to inertia member 13. Moving member 11 is in contact with a fixed member 14 through a friction surface 11a. Fixed member 14 does not make contact with piezoelectric member 12 or inertia member 13.

FIGS. 2(A), 2(B), 2(C), 2(D) and 2(E) are diagrams illustrating the operation of the conventional piezoelectric actuator illustrated in FIG. 1. Referring now to FIGS. 2(A), 2(B), 2(C), 2(D) and 2(E), one asymmetric waveform cycle of a drive signal 50 is applied to piezoelectric member 12.

In FIG. 2(A), various forces affect moving member 11, wherein these forces are related to the weight, M, of moving member 11, the weight, m, of inertia member 13 and the dynamic friction coefficient, $\mu$, between moving member 11 and fixed member 14. FIG. 2(A) also illustrates the displacement, x, of piezoelectric member 12, and the displacement, y, of moving member 11. At the point of time "ta" in FIG. 2(A), the pulse of drive signal 50 has not yet been applied to piezoelectric member 12, and a drive force has not been produced. At the point of time "tb" in FIG. 2(B), a portion of the pulse of drive signal 50 with a large voltage increase rate is applied to piezoelectric member 12. This large voltage increase rate causes piezoelectric member 12 to expand in correspondence with the applied voltage. At this time, the expansion rate of piezoelectric member 12 is large and steep. Therefore, a reaction force of the shock inertia 52 generated from inertia member 13 is added to moving member 11, and that reaction force overcomes the static friction force of friction surface 11a. As a result, moving member 11 moves in the direction of arrow 54.

At the point of time "tc" in FIG. 2(C), piezoelectric member 12 stops expanding and, because displacement is not produced, moving member 11 stops moving.

At the point of time "td" in FIG. 2(D), a portion of the pulse of drive signal 50 with a small voltage reduction rate is applied to piezoelectric member 12. Piezoelectric member 12 contracts in correspondence with the applied voltage. At this time, the contraction rate of piezoelectric member 12 is small and gentle due to the small voltage reduction rate. Therefore, the reaction force 56 of inertia member 13 becomes smaller than the static friction force of friction surface 11a. As a result, moving member 11 does not move. For this situation to occur, the voltage reduction rate of drive signal 50, as illustrated in FIG. 2(D), must be sufficiently small as compared to the voltage increase rate of drive signal 50, as illustrated in FIG. 2(B).

At the point of time "te" in FIG. 2(E), a pulse of drive signal 50 is not being applied to piezoelectric member 12, and piezoelectric actuator 10 enters the same initial state as in FIG. 2(A).

In this manner and as illustrated by FIGS. 2(A), 2(B), 2(C), 2(D) and 2(E), moving member 11 moves in accordance with one asymmetric waveform cycle of drive signal 50 applied thereto. Specifically, when an asymmetric drive signal is used to drive piezoelectric member 12, the first half of a pulse of the drive signal has a large voltage increase rate so that the reaction force of the shock inertia generated from inertia member 13 is added to moving member 11. This reaction force overcomes the static friction force of friction surface 11a. As a result, moving member 11 moves.

The latter half of the pulse of the drive signal has a small voltage reduction rate. Then, the reaction force of inertia generated from inertia member 13 is added to moving member 11. However, the reaction force is smaller than the static friction force of friction surface 11a. As a result, moving member 11 does not move. In this manner, the movement of moving member 11 is controlled by one asymmetric waveform cycle of a drive signal.

If the weight of inertia member 13 is smaller than the weight of moving member 11, the amount of drive caused by one asymmetric waveform can be extremely minute. This is an important, beneficial aspect of piezoelectric actuator 10 since it is desirable to cause movable body 11 to move by very small amounts. However, the amount of movement of moving member 11 can undesirably change if the friction coefficient of friction surface 11a changes between moving member 11 and fixed member 14. Such change in the friction coefficient can occur from changes in temperature, humidity or other such factors. As a result, a predetermined or set amount of movement of moving member 11 per cycle of the drive signal may undesirably change. Therefore, the amount of movement of moving member 11 for a specific number of cycles of the drive signal may change, and the time required for moving member 11 to move a predetermined distance may change.

Moreover, the surface roughness of friction surface 11a can significantly change during movement, thereby undesirably changing the amount of movement of moving member 11 per cycle of the drive signal.

FIG. 3 illustrates a piezoelectric actuator as disclosed in Japanese Laid-open Patent Publication Number Hei-4-207982. The piezoelectric actuator illustrated in FIG. 3 attempts to solve the above-described problems by intentionally changing the friction coefficient of the friction surface. Referring now to FIG. 3, the piezoelectric actuator has a moving member 206 with a first inertia member 208 and a second inertia member 210 connected thereto. First inertia member 208 is connected to moving member 206 via a first piezoelectric member 207. Second inertia member 210 is connected to moving member 206 via a second piezoelectric member 209. A respective sinusoidal wave (symmetric waveform) is applied to first piezoelectric member 207 and a different, respective sinusoidal wave is applied to second piezoelectric member 209. First piezoelectric member 207 expands and contracts, in accordance with the sinusoidal wave applied to first piezoelectric member 207, to change the friction coefficient of a drive surface 205. In this manner, moving member 206 is driven when the friction coefficient becomes low. The amount of drive of moving member 206 is controlled by changing the phase difference of the two sinusoidal waves applied, respectively, to first piezoelectric member 207 and second piezoelectric member 209.

However, it is difficult and complicated to control the phase of the sinusoidal waves applied to first piezoelectric member 207 and second piezoelectric member 209. In addition, as described above, the piezoelectric actuator illustrated in FIG. 3 moves moving member 206 by changing the friction coefficient of the friction surface. However, it is difficult to determine the appropriate friction coefficient and to properly change the friction coefficient. Moreover, a piezoelectric actuator as illustrated in FIG. 3 requires two piezoelectric bodies (as opposed to only one piezoelectric member) and two inertia bodies (as opposed to only one inertia member). Therefore, a piezoelectric actuator as illustrated in FIG. 3 is relatively expensive and difficult to manufacture.

SUMMARY OF THE INVENTION

Accordingly, it is an object of the present invention to provide a piezoelectric actuator in which the amount of movement of the moving member is approximately constant per cycle of the drive signal, and where the amount of movement of the moving member is approximately constant even if the friction conditions between the moving member and the fixed member are changed.

It is a further object of the present invention to provide a piezoelectric actuator in which the amount of movement of the moving member is approximately constant for a multiple number of cycles of the drive signal, thereby fixing the time required for the moving member to move a specific distance and stabilizing the drive of the piezoelectric actuator.

Objects of the present invention are achieved by providing an actuator including an electromechanical converting element having a first connection portion and a second connection portion, an inertia member connected to the first connection portion of the electromechanical converting element and a moving member connected to the second connection portion of the electromechanical converting element. A drive signal control unit produces a drive signal having an asymmetric voltage waveform. The asymmetric voltage waveform has a voltage level increasing portion in which the voltage level of the asymmetric voltage waveform is increasing. The drive signal control unit controls the amount of time of the voltage level increasing portion of the asymmetric voltage waveform and applies the drive signal to the electromechanical converting element to generate an inertia force in the inertia member and cause the moving member to move.

A setting unit can be provided to set an amount of movement for moving the moving member with respect to the asymmetric voltage waveform of the drive signal, and a detection unit can be provided for detecting the actual amount of movement of the moving member with respect to the asymmetric voltage waveform of the drive signal. In this case, the drive signal control unit adjusts the asymmetric voltage waveform of the drive signal in accordance with the amount of movement set by the setting unit and the actual amount of movement detected by the detection unit to eliminate differences between the amount of movement set by the setting unit and the actual amount of movement detected by the detection unit.

Objects of the present invention are also achieved by providing an actuator which includes an electromechanical converting element having a first connection portion and a second connection portion, an inertia member connected to the first connection portion of the electromechanical converting element, and a moving member connected to the second connection portion of the electromechanical converting element. A drive signal control unit produces a drive signal having an asymmetric voltage waveform. The asymmetric voltage waveform has a voltage level increasing portion in which the voltage level of the asymmetric voltage waveform is increasing. The drive signal control unit controls the voltage level of the asymmetric voltage waveform during the voltage level increasing portion of the asymmetric voltage waveform and applies the drive signal to the electromechanical converting element to generate an inertia force in the inertia member and cause the moving member to move. Further, in addition to controlling the voltage level of the asymmetric voltage waveform during the voltage level increasing portion, the drive signal control unit can control the amount of time of the voltage level increasing portion of the asymmetric voltage waveform.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 1 (prior art) is a diagram illustrating a conventional piezoelectric actuator.

FIGS. 2(A), 2(B), 2(C), 2(D) and 2(E) (prior art) are diagrams illustrating the operation of a conventional piezoelectric actuator.

FIGS. 6(A), 6(B) and 6(C) are diagrams illustrating changes in the amount of drive of a moving member by changing the voltage of an asymmetric waveform of a drive signal for driving a piezoelectric actuator, according to an embodiment of the present invention.

FIGS. 7(A), 7(B) and 7(C) are diagrams illustrating changes in the amount of drive of a moving member by changing the voltage change time of an asymmetric waveform of a drive signal for driving a piezoelectric actuator, according to an embodiment of the present invention.

FIGS. 8(A), 8(B) and 8(C) are diagrams illustrating changes in the amount of drive of a moving member by changing the voltage and the voltage change time of an asymmetric waveform of a drive signal for driving a piezoelectric actuator, according to an embodiment of the present invention.

DESCRIPTION OF THE PREFERRED EMBODIMENTS

Figure 3:
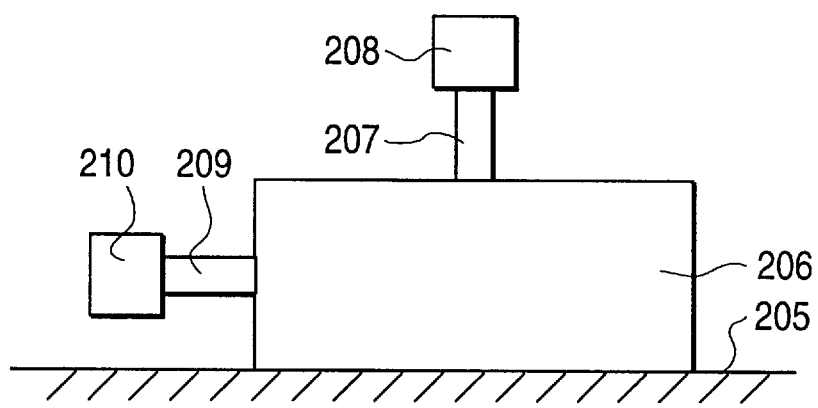
FIG. 3 (prior art) is a diagram illustrating a conventional piezoelectric actuator.

Reference will now be made in detail to the present preferred embodiments of the present invention, examples of which are illustrated in the accompanying drawings, wherein like reference numerals refer to like elements throughout.

Figure 4:
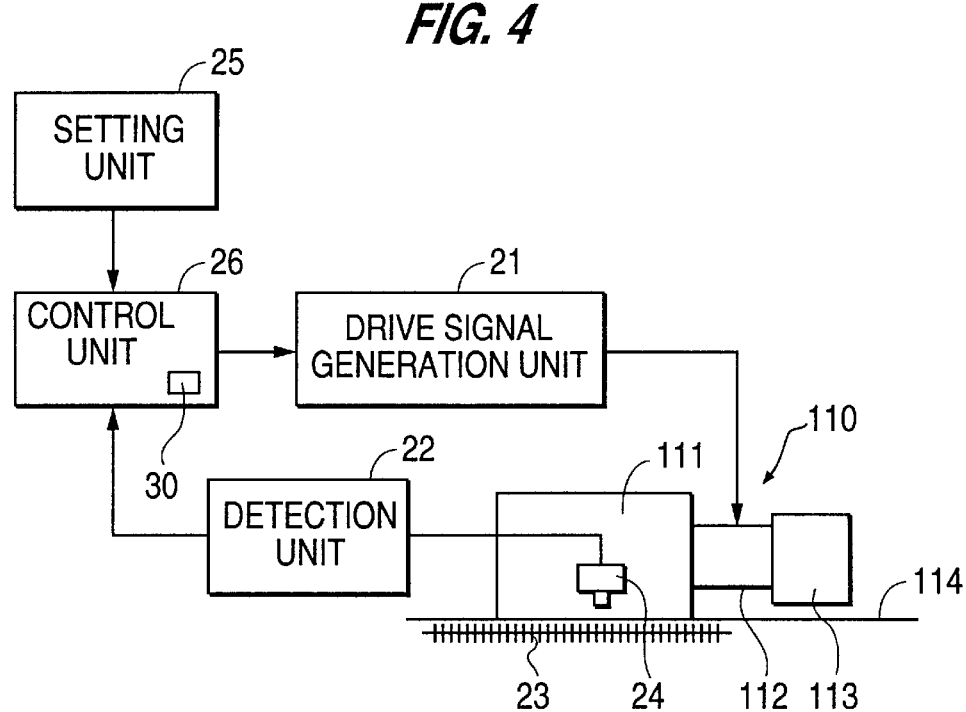
FIG. 4 is a block diagram illustrating a piezoelectric actuator, according to an embodiment of the present invention.

FIG. 4 is a block diagram illustrating a piezoelectric actuator, according to an embodiment of the present invention. Referring now to FIG. 4, a piezoelectric actuator 110 comprises a piezoelectric member 112. Piezoelectric member 112 is a conventional electromechanical converting element, an example of which is a laminated type piezoelectric member that expands and contracts based on drive signals applied thereto. An inertia member 113 is bonded to one end of piezoelectric member 112, and generates an inertia force based on deformations of piezoelectric member 112. A moving member 111 is bonded to the other end of piezoelectric member 112, and receives the inertia force from inertia member 113. A fixed member 114 is in slidable contact with moving member 111, but does not make contact with either piezoelectric member 112 or inertia member 113.

A drive signal generation unit 21 generates a drive signal having asymmetric cyclic voltage waveforms, where the voltage increase rate in the first half of each asymmetric cyclic voltage waveform is large, and the voltage reduction rate in the latter half of each asymmetric cyclic voltage waveform is small. The drive signal generated by drive signal generation unit 21 is applied to piezoelectric member 112. A detection unit 22 includes a linear scale 23 provided on fixed member 14, and a detector 24 to optically detect linear scale 23. Detection unit 22 detects the amount of movement (the "detected amount") of moving member 111 per waveform, and produces a corresponding output signal which is provided to a control unit 26. Control unit 26 can be provided with a Read Only Memory (ROM) for storing certain parameters, discussed later. A setting unit 25 sets the amount of movement (the "set amount") of moving member 111 per waveform of the drive signal, and supplies the set amount to control unit 26.

Control unit 26 controls the voltage value of the asymmetric cyclic voltage waveform produced by drive signal generation unit 21 by comparing the detected amount of movement by detection unit 22 and the set amount set by setting unit 25, and produces a corresponding output signal. The output signal produced by control unit 26 is provided to drive signal generation unit 21. Therefore, control unit 26 compares the set amount of movement and the detected amount of movement, and controls the voltage value of the next waveform of the drive signal generated by drive signal generation unit 21. Control unit 26 and drive signal generation unit 21 can together be referred to as a drive signal control unit which produces a drive signal having an asymmetric voltage waveform, and applies the drive signal to piezoelectric member 112 to generate an inertia force in inertia member 113 and cause moving member 111 to move. In this manner, the amount of drive of moving member 111 can be controlled. Consequently, the amount of drive per drive signal cycle (or waveform) can be nearly fixed even if the friction conditions between moving member 111 and fixed member 114 change. Therefore, even if the set value of setting unit 25 is made larger or smaller, the amount of movement of moving member 111 changes in correspondence with the set value, and the amount of movement of moving member 111 can be fixed at the set value.

If the weight of moving member 111 equals M, the weight of inertia member 113 equals m, the dynamic friction coefficient between moving member 111 and fixed member 114 equals $\mu$, the displacement of piezoelectric member 112 equals x, the displacement of moving member 111 equals y, and the acceleration of gravitation equals g, then the kinetic formula in the state illustrated in FIG. 2(B) can be approximated by the following Equation (1).

$$d^2y/dt^2 = -(m/(M+m)) \cdot (d^2x/dt^2) + \mu g$$

When deriving the functions of y and x by solving Equation 1, the following Equations (2) and (3) result:

$$dy/dt = -(m/(M+m)) \cdot dx/dt + \mu gt \qquad \text{Equation (2)}$$

$$y + -(m/(M+m))x + (\tfrac{1}{2})\mu gt^2 \qquad \text{Equation (3)}$$

Figure 5:
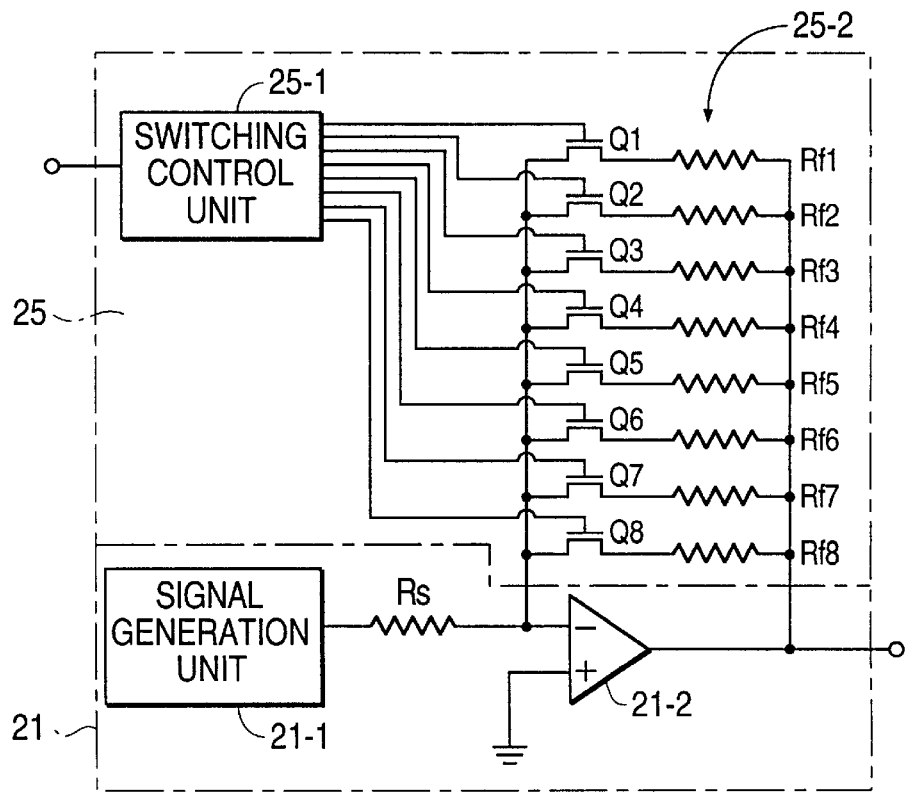
FIG. 5 is a diagram illustrating a mechanism for controlling the voltage of an asymmetric waveform applied to a piezoelectric actuator, according to an embodiment of the present invention.

FIG. 5 is a diagram illustrating a mechanism for controlling the voltage of an asymmetric waveform of a drive signal applied to a piezoelectric actuator, according to an embodiment of the present invention. Referring now to FIG. 5, drive signal generation unit 21 includes a signal generation unit 21-1 which generates a source drive signal. The source drive signal generated by signal generation unit 21-1 is amplified and adjusted to a suitable drive signal by an operational amplifier 21-2. Drive signal generation unit 21 then applies this signal to piezoelectric member 112. Control unit 26 compares the detected amount of movement detected by detection unit 22 with the set amount of setting unit 25, and changes the amount of amplification of operational amplifier 21-2 by commanding a switching control unit 25-1 to turn ON and OFF switching element 25-2 so that the difference between the detected amount of movement by detection unit 22 and the set amount of setting unit 25 is reduced to approximately zero. Switching element 25-2 includes transistors Q1 through Q8, and resistors Rf1 through Rf8.

In FIG. 5, eight amplification amounts can be selected using transistors Q1 through Q8. However, the number of transistors and the number of amplifications amounts is not intended to be limited to eight and can easily be made to be any desired number. A larger number of selectable amplification amounts makes it possible to have a finer control of the amount of movement of movable body 111.

FIGS. 6(A), 6(B) and 6(C) are diagrams illustrating changes in the amount of drive of moving member 111 by changing the voltage of an asymmetric waveform of a drive signal for driving a piezoelectric actuator, with the voltage change time of the asymmetric waveform held constant, according to an embodiment of the present invention. FIGS. 6(A), 6(B) and 6(C) are best understood by referring to Equation (3), above. Equation (3) indicates that when x increases, the absolute value of y increases. In piezoelectric member 112 there is a nearly linear relationship of the applied voltage and the amount of deformation (amount of expansion). Consequently, when the voltage value of the cyclic voltage waveform is increased, the amount of expansion x of piezoelectric member 112 increases. Therefore, FIG. 6(A) illustrates an applied voltage value of Va producing a corresponding amount of drive ya. FIG. 6(B) illustrates an applied voltage value of Vb producing a corresponding amount of drive yb. Similarly, FIG. 6(C) illustrates an applied voltage value of Vc producing a corresponding amount of drive yc. Va<Vb<Vc and ya<yb<yc. Therefore, as indicated in FIGS. 6(A), 6(B) and 6(C), as the voltage value increases from Va to Vb to Vc, the amount of drive y of moving member 111 correspondingly increases from ya to yb to yc, respectively.

FIGS. 7(A), 7(B) and 7(C) are diagrams illustrating changes in the amount of drive of moving member 11 1 by changing the voltage change time of an asymmetric waveform of a drive signal for driving a piezoelectric actuator, with the voltage of the asymmetric waveform held constant, according to an embodiment of the present invention. According to an embodiment of the present invention as illustrated in FIGS. 7(A), 7(B) and 7(C), the amount of drive of moving member 111 is controlled by changing the time during which the voltage applied to piezoelectric member 112 is increased. Specifically, control unit 26 compares the set amount set by setting unit 25 and the detected amount of movement detected by detection unit 22, and controls the time of voltage increase of the next waveform of the drive signal generated by drive signal generation unit 21. In this manner, the amount of drive of moving member 111 can be controlled.

FIGS. 7(A), 7(B) and 7(C) are best understood by referring to Equation (3), above. Equation (3) indicates that the absolute value of y increases when t decreases. Specifically, when the time of voltage increase of the cyclic voltage waveform of the drive signal is reduced, a reduction of the drive force based on the dynamic friction force is lowered and moving member 111 moves a greater distance. Therefore, FIG. 7(A) indicates a time of voltage increase of ta producing an amount of movement of moving member 111 equal to ya'. FIG. 7(B) indicates a time of voltage increase of tb producing an amount of movement of moving member 111 equal to yby'. FIG. 7(C) indicates a time of voltage increase of tc producing an amount of movement of moving member 111 equal to ye'. ta>tb>tc and ya'<yb'<yc'. Consequently, as indicated in FIGS. 7(A), 7(B), and 7(C), as the time of voltage increase is reduced, the amount of drive of moving member 11 corresponding increases. Therefore, a time of voltage increase equal to tc is much smaller (quicker) than a time of voltage increase equal to ta. Therefore, the time of voltage increase tc produces an amount of movement yc' which is much larger than the amount of movement ya' produced by the time of voltage increase ta. The time of voltage increase can be made to vary by switching between several circuits, each of which has a respective, different rise time in relation to voltage.

FIGS. 8(A), 8(B) and 8(C) are diagrams illustrating changes in the amount of drive of moving member 111 by changing both the voltage and the voltage change time of an asymmetric waveform of a drive signal for driving a piezoelectric actuator, according to an embodiment of the present invention. According to an embodiment of the present invention as illustrated in FIGS. 8(A), 8(B) and 8(C), the amount of drive of moving member 111 is controlled by varying both the voltage value of the waveform of the drive signal and the time during which the voltage of the waveform increases. Specifically, control unit 26 compares the set value that is set by setting unit 25 and the detected amount of movement by detection unit 22, and controls the voltage value and voltage increase time of the waveform of the drive signal generated by drive signal generation unit 21. In this manner, the amount of drive of moving member 111 can be controlled.

FIGS. 8(A), 8(B) and 8(C) are best understood by referring to Equation (3), above. Referring to Equation (3), it is known that when x increases and t decreases, the absolute value of y increases. When the voltage value of the cyclic voltage waveform of the drive signal is made to increase, the amount of expansion of piezoelectric member 112 increases. Moreover, when the voltage increase time of that frequency voltage waveform decreases, the reduction of the drive power based on the dynamic force of friction is lowered.

Therefore, in FIG. 8(A), a voltage value increase Va and a voltage increase time ta produces an amount of drive ya". In FIG. 8(B), a voltage value increase Vb and a voltage increase time tb produces an amount of drive yb". In FIG. 8(C), a voltage value increase Vc and a voltage increase time tc produces an amount of drive yc". ta>tb>tc, Va<Vb<Vc and ya"<yb"<yc". The voltage value and the voltage increase time can be modified by switching between several circuits which have different start-up times in relation to the respective amount of voltage amplification and the given voltage.

In the embodiment of the present invention illustrated in FIGS. 8(A), 8(B) and 8(C), the voltage value increase (for example, Va, Vb and Vc) and voltage increase time (for example, ta, tb and tc) are both controlled. Therefore, the embodiment of the present invention illustrated in FIGS. 8(A), 8(B) and 8(C) greatly expands the control range for the amount of drive of moving member 111 as compared to the embodiment of the present invention illustrated in FIGS. 6(A), 6(B) and 6(C), and the embodiment of the present invention illustrated in FIGS. 7(A), 7(B) and 7(C).

According to the above embodiments of the present invention, it is advantageous to arrange piezoelectric actuator 110 so that the amount of movement of moving member 111 set by setting unit 25 (that is, the "set amount") and the amount of actual movement of moving member 111 (that is, the "amount of drive") are nearly the same. In this situation, there is an improvement in the precision during control and in the time required from the beginning of control until completion of control of the movement of moving member 111. In this regard, the value of the drive voltage is limited to a certain extent. Consequently, if the amount of movement (resolution) in relation to one waveform of the drive signal is changed, it may not be possible to obtain the specified resolution by only adjusting the drive voltage.

In this situation and according to an embodiment of the present invention, the adjustment of the resolution is performed by changing the weight ratio (m/(M+m)) of moving member 111 (having weight M) and inertia member 113 (having weight m). Specifically, when viewed by the same drive voltage, if the weight ratio is made smaller, the amount of movement in relation to one waveform of the driving signal becomes smaller. Conversely, when the weight ratio is made larger, the amount of movement in relation to one waveform of the drive signal becomes larger. Consequently, when it is desirable to raise the precision in determining the position of moving member 111, the resolution can be improved by making the weight ratio smaller.

However, after an adjustment is made such that the set amount of movement of moving member 111 set by setting unit 25 and the amount of actual movement (drive amount) of moving member 111 becomes nearly equal, various problems arise if the weight ratio of moving member 111 and inertia member 113 is changed too much. Specifically, sometimes the actual amount of movement of moving member 111 becomes significantly different from the set amount of setting unit 25. In this situation, it is possible to make the amount of movement per drive speed and waveform of the drive signal be nearly fixed. However, time and precision required for control will drop.

This problem can be resolved as follows. Referring now to FIG. 4, control unit 26 is provided with a Read-Only Memory (ROM) 30 as a memory. ROM 30 stores several types of commands which are set in advance to correspond to the weight ratio of moving member 111 and inertia member 113. Then, the weight ratio which the operator desires can be selected by a switching unit (not illustrated). Control unit 26 then changes the command value provided to drive signal generation unit 21 following the command that is set in correspondence with selected weight ratio. For example, when m/(M+m) is made smaller, the command value changes such that the voltage value becomes smaller. In addition, when m/(M+m) is made smaller, the command value may be changed such that the voltage change time becomes longer. When m/(M+m) is made larger, the command value is changed such that the voltage value becomes larger. In addition, when m/(M+m) is made larger, the command value may be changed such that the voltage change time becomes shorter.

Switching the weight ratio set in ROM 30 may be accomplished by an operator manually executing a switching operation. Also, piezoelectric actuator 110 may be configured such that the command value is switched by automatically detecting the weight ratio. For example, a bar code (not illustrated) which includes information relating to the weight ratio can be provided on inertia member 13. The system may be made such that the command value is switched by reading that bar code. Also, if a transmitting unit (not illustrated) which transmits information relating to the weight ratio is provided on inertia member 113 itself, the system may be made such that the command value is switched by receiving that information.

Therefore, according to the above embodiment of the present invention, even if the weight ratio of moving member 111 and inertia member 113 changes, the set amount which is generated from setting unit 25 can be made to nearly agree with the moving weight of moving member 111. For this reason, it is not necessary to adjust the set weight and the moving weight each time the weight ratio changes.

According to the above embodiments of the present embodiment, detection unit 22 optically detects linear scale 23 using detector 24; however, a magnetic detection method or a different detection method can be used to detect the amount of movement of moving member 111. Moreover, even if a system of detecting a linear scale is not used, a method may be used in which a non-contact displacement meter is arranged on fixed member 114, and the amount of movement of moving member 111 is detected by providing a reflective member on moving member 111. Moreover, many other methods and devices may be used to detect the amount of movement of moving member 111.

According to the above embodiments of the present invention, control unit 26 controls the next waveform of the drive signal by comparing the detected value with the set value of the amount of drive per waveform. However, a system may also be used in which several (for example, ten (10)) waveforms from after the next waveform of the drive signal are made to be the same voltage value by comparing the average value of the detected value of several (for example, ten (10)) drive waveforms with the set value.

Moreover, according to the above embodiments of the present invention, the first half of the voltage increase rate of an asymmetric frequency voltage waveform was large and the voltage decrease rate of the latter half of the asymmetric frequency voltage waveform was small. However, the opposite may be used, and the voltage increase rate of the first half of the waveform may be small and the voltage decrease rate of the latter half of the waveform may be large. In this situation, the direction of drive of moving member 111 is reversed.

Furthermore, according to the above embodiments of the present invention, the parameters of the amount of drive of the set value and the detected value were taken to be the amount of movement per waveform of the drive signal. However, the parameters of the amount of drive of the set value and the detected value may be taken as the amount of drive (velocity) per unit time.

According to the above embodiments of the present invention, the electromechanical converting element (for example, piezoelectric member 112) is a laminated type piezoelectric member. However, virtually any type of electromechanical converting element may be used. For example, a Langevin vibrating element may be used. Additionally, a general piezoelectric member or an electrostriction element may be used. Here, in order to capture a large amount of displacement, a laminated type piezoelectric member can be used.

According to the above embodiments of the present invention, drive signal generation unit 21 is controlled by detecting the amount of movement of moving member 111 per cycle of the drive signal. Therefore, the amount of movement per cycle (waveform) of the drive signal can be kept nearly fixed (that is, "constant"), even if the friction conditions between moving member 111 and fixed member 114 change. Consequently, it is possible to keep the amount of drive of moving member 111 nearly fixed when several waveforms of the drive signal are applied, and it is possible to nearly fix the time during which moving member 111 moves a predetermined distance.

In a piezoelectric actuator according to an embodiment of the present invention, control unit 26 controls the voltage waveform of the drive signal generated by drive signal generation unit 21. In this manner, the amount of movement of moving member 111 can be controlled. Further, control unit 26 changes the value of the voltage of the drive signal generated by drive signal generation unit 21. In this manner, the amount of expansion of the entire body of piezoelectric member 112 can be changed, and the amount of movement of moving member 111 can be controlled.

In a piezoelectric actuator according to an embodiment of the present invention, control unit 26 changes the voltage change time of the waveform of the drive signal produced by drive signal generation unit 21. In this manner, the time during which the force of inertia is generated can be changed, and the amount of movement of moving member 111 can be controlled. Moreover, in a piezoelectric actuator according to an additional embodiment of the present invention, control unit 26 changes both the voltage value and the voltage change time of the waveform of the drive signal produced by drive signal generation unit 21. In this manner, the amount of expansion of the entire body of piezoelectric member 112 and the time during which the force of inertia is generated can be controlled. Consequently, the amount of movement of moving member 111 can be controlled.

In a piezoelectric actuator according to an embodiment of the present invention, the actual amount of movement of moving member 111 is detected by detection unit 22. Control unit 26 controls the drive signal generated by drive signal generation unit 21 based on the detected amount. In this manner, the amount of movement of moving member 111 can be controlled.

Further, in a piezoelectric actuator according to an embodiment of the present invention, the amount of movement of moving member 111 is set by setting unit 25. Also, the actual amount of movement of moving member 111 is detected by detection unit 22. Control unit 26 controls the waveform of the drive signal generated by drive signal generation unit 21 by comparing the set amount and the detected amount. In this manner, the amount of movement of moving member 111 can be controlled.

In a piezoelectric actuator according to an embodiment of the present invention, the actual amount of movement of moving member 111 is detected through the use of detector 24, functioning as an encoder, and provided on fixed member 114. Control unit 26 controls the drive signal produced by drive signal generation unit 21 based on the detected amount. In this manner, the amount of movement of moving member 111 can be controlled.

In a piezoelectric actuator according to an embodiment of the present invention, previously set parameters are stored within memory 30. The parameters correspond to the weight ratio of moving member 111 and inertia member 113.

Control unit 26 controls the drive signal generated by drive signal generation unit 21 based on these parameters. Therefore, even if the weight ratio of moving member 111 and inertia member 113 changes, a specified amount of movement can be obtained.

In a piezoelectric actuator according to an embodiment of the present invention, control unit 26 reduces the value of the voltage of the waveform of the drive signal produced by drive signal generation unit 21 when the weight ratio of moving member 111 and inertia member 113 is small. Also, control unit 26 reduces the voltage value of the waveform of the drive signal when the weight ratio is large. In this manner, a specified amount of movement of moving member 111 can be obtained even if the weight ratio of moving member 111 and inertia member 113 changes.

In a piezoelectric actuator according to an embodiment of the present invention, control unit 26 reduces the value of the voltage of the waveform of the drive signal produced by drive signal generation unit 21 when the weight ratio of moving member 111 and inertia member 113 is small. Also, control unit 26 reduces the voltage value of the waveform of the drive signal when the weight ratio is large. In this manner, a specified amount of movement of moving member 111 can be obtained even if the weight ratio of moving member 111 and inertia member 113 changes.

There are several important differences between a piezoelectric actuator according to the above embodiments of the present invention, and the piezoelectric actuator disclosed in Japanese Laid-open Patent Publication Number Hei-4-207982 and described in the Background of the Invention section, above.

First, a piezoelectric actuator according to the above embodiments of the present invention only requires one moving member, one piezoelectric member and one inertia member. By contrast, a piezoelectric actuator according to Japanese Laid-open Patent Publication Number Hei-4-207982 requires one moving member, two piezoelectric bodies and two inertia bodies.

Second, a piezoelectric actuator according to the above embodiments of the present invention applies an asymmetric waveform to the piezoelectric member. By contrast, a piezoelectric actuator according to Japanese Laid-open Patent Publication Number Hei-4-207982 applies a sinusoidal wave (symmetric waveform) to each of the two piezoelectric bodies.

Third, in a piezoelectric actuator according to the above embodiments of the present invention, the force of inertia from an inertia member becomes larger than the friction force holding the moving member, thereby causing the driving of the moving member when a steep input voltage is applied to the piezoelectric member. By contrast, in piezoelectric actuator according to Japanese Laid-open Patent Publication Number Hei-4-207982, the expansion and contraction of a first piezoelectric member changes the friction coefficient of the drive surface, thereby driving the moving member when the friction coefficient becomes low.

Fourth, in a piezoelectric actuator according to the above embodiments of the present invention, the amount of drive of the moving member and the speed of the moving member are controlled by changing the shape of the waveform of a drive signal applied to the piezoelectric member. By contrast, in a piezoelectric actuator according to Japanese Laid-open Patent Publication Number Hei-4-207982, the amount of drive of the moving member is controlled by changing the phase difference of two sinusoidal waves respectively applied to two piezoelectric bodies.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An actuator comprising:
   an electromechanical converting element having a first connection portion and a second connection portion;
   an inertia member connected to the first connection portion of the electromechanical converting element;
   a moving member connected to the second connection portion of the electromechanical converting element; and
   a drive control unit which
      produces a first asymmetric voltage waveform and applies the first asymmetric voltage waveform to the electromechanical converting element to generate an inertia force in the inertia member and cause the moving member to move in response to the applied first asymmetric voltage waveform,
      produces a second asymmetric voltage waveform which is not contiguous with the first asymmetric voltage waveform and applies the second asymmetric voltage waveform, after the first asymmetric voltage waveform, to the electromechanical converting element to generate an inertia force in the inertia member and cause the moving member to move in response to the applied second asymmetric voltage waveform, and
      controls the second asymmetric voltage waveform in accordance with an actual amount of movement of the moving member caused by the first asymmetric voltage waveform.

2. An actuator as in claim 1, wherein the drive control unit controls the second asymmetric voltage waveform by controlling a voltage level of the second asymmetric voltage waveform.

3. An actuator as in claim 1, wherein
   the second asymmetric voltage waveform has a voltage level increasing portion in which the voltage level of the second asymmetric voltage waveform is increasing, and
   the drive control unit controls the second asymmetric voltage waveform by controlling the amount of time of the voltage level increasing portion of the second asymmetric voltage waveform in accordance with the actual amount of movement of the moving member caused by the first asymmetric voltage waveform.

4. An actuator as in claim 1, wherein
   the second asymmetric voltage waveform has a voltage level increasing portion in which the voltage level of the second asymmetric voltage waveform is increasing, and
   the drive control unit controls the second asymmetric voltage waveform by controlling the voltage level of the second asymmetric voltage waveform during the voltage level increasing portion of the second asymmetric voltage waveform.

5. An actuator as in claim 4, wherein, in addition to controlling the voltage level of the second asymmetric voltage waveform during the voltage level increasing portion, the drive control unit controls the second asymmetric voltage waveform by controlling the amount of time of the voltage level increasing portion of the second asymmetric voltage waveform.

6. An actuator as in claim 3, wherein the second asymmetric voltage waveform has a voltage level decreasing portion in which the voltage level of the second asymmetric voltage waveform is decreasing, the rate of voltage level increase of the voltage level increasing portion being larger than the rate of voltage level decrease of the voltage level decreasing portion.

7. An actuator as in claim 4, wherein the second asymmetric voltage waveform has a voltage level decreasing portion in which the voltage level of the second asymmetric voltage waveform is decreasing, the rate of voltage level increase of the voltage level increasing portion being larger than the rate of voltage level decrease of the voltage level decreasing portion.

8. An actuator as in claim 5, wherein the second asymmetric voltage waveform has a voltage level decreasing portion in which the voltage level of the second asymmetric voltage waveform is decreasing, the rate of voltage level increase of the voltage level increasing portion being larger than the rate of voltage level decrease of the voltage level decreasing portion.

9. An actuator as in claim 1, further comprising:
a setting unit for setting a same amount of movement for moving the moving member in response to each of the first and second asymmetric voltage waveforms; and
a detection unit for detecting the actual amount of movement of the moving member in response to the first and second asymmetric voltage waveforms,
wherein the drive control unit controls the second asymmetric voltage waveform in accordance with the amount of movement set by the setting unit and the actual amount of movement of the moving member detected by the detection unit for the first asymmetric voltage waveform.

10. An actuator as in claim 9, wherein the drive control unit controls the second asymmetric voltage waveform to eliminate differences between the amount of movement set by the setting unit and the actual amount of movement of the moving member detected by the detection unit for the second asymmetric voltage waveform.

11. An actuator as in claim 9, further comprising:
a fixed member which makes slidable contact with the moving member and which does not make contact with the electromechanical converting element and the inertia body, the moving member moving along the fixed member in response to the first and second asymmetric voltage waveforms being applied to the electromechanical conversion member,
wherein the detection unit includes an encoder to detect the actual amount of movement of the moving member along the fixed member.

12. An actuator as in claim 10, further comprising:
a fixed member which makes slidable contact with moving member and which does not make contact with the electromechanical converting element and the inertia body, the moving member moving along the fixed member in response to the first and second asymmetric voltage waveforms being applied to the electromechanical conversion member,
wherein the detection unit includes an encoder to detect the actual amount of movement of the moving member along the fixed member.

13. An actuator as in claim 1, wherein the drive control unit stores parameters corresponding to different possible weight ratios of the moving member and the inertia member, and produces the first and second asymmetric voltage waveforms in accordance with stored parameters corresponding to the actual weight ratio of the moving member and the inertia member.

14. An actuator as in claim 13, wherein the second asymmetric voltage waveform has a voltage level increasing portion in which the voltage level of the second asymmetric voltage waveform is increasing, and the drive control unit controls the second asymmetric voltage waveform by controlling the voltage level of the second asymmetric voltage waveform during the voltage level increasing portion of the second asymmetric voltage waveform so that the voltage level respectively corresponds to the weight ratio of the moving member and the inertia member, and a lower weight ratio results in a lower voltage level as compared to the voltage level resulting from a higher weight ratio.

15. An actuator as in claim 13, wherein the second asymmetric voltage waveform has a voltage level increasing portion in which the voltage level of the second asymmetric voltage waveform is increasing, and the drive control unit controls the second asymmetric voltage waveform by controlling the amount of time of the voltage level increasing portion of the second asymmetric voltage waveform so that the amount of time of the voltage level increasing portion respectively corresponds to the weight ratio of the moving member and the inertia member, and a lower weight ratio results in a longer amount of time of the voltage level increasing portion as compared to the amount of time of the voltage level increasing portion resulting from a higher weight ratio.

16. An actuator comprising:
an electromechanical converting element having a first connection portion and a second connection portion;
an inertia member connected to the first connection portion of the electromechanical converting element;
a moving member connected to the second connection portion of the electromechanical converting element;
a drive signal control unit producing a drive signal having sequential, first and second asymmetric voltage waveforms which are not continuous with each other, the second asymmetric voltage waveform having a voltage level increasing portion in which the voltage level of the second asymmetric voltage waveform is increasing, the drive signal control unit controlling the amount of time of the voltage level increasing portion of the second asymmetric voltage waveform and applying the drive signal to the electromechanical converting element to generate an inertia force in the inertia member and cause the moving member to move;
a setting unit for setting a same amount of movement for moving the moving member with respect to each of the first and second asymmetric voltage waveforms of the drive signal; and
a detection unit for detecting the actual amount of movement of the moving member with respect to the first and second asymmetric voltage waveforms of the drive signal, wherein the drive signal control unit controls the amount of time of the voltage level increasing portion of the second asymmetric voltage waveform in accordance with the amount of movement set by the setting unit and the actual amount of movement detected by the detection unit for the first asymmetric voltage waveform, to eliminate differences between the amount of movement set by the setting unit and the actual amount of movement detected by the detection unit for the second asymmetric voltage waveform.

17. An actuator as in claim 16, wherein the second asymmetric voltage waveform has a voltage level decreasing portion in which the voltage level of the second asymmetric voltage waveform is decreasing, the rate of voltage level increase of the voltage level increasing portion being larger than the rate of voltage level decrease of the voltage level decreasing portion.

18. An actuator comprising:

an electromechanical converting element having a first connection portion and a second connection portion;

an inertia member connected to the first connection portion of the electromechanical converting element;

a moving member connected to the second connection portion of the electromechanical converting element;

a drive signal control unit producing a drive signal having sequential, first and second asymmetric voltage waveforms which are not continuous with each other, the second asymmetric voltage waveform having a voltage level increasing portion in which the voltage level of the second asymmetric voltage waveform is increasing, the drive signal control unit controlling the voltage level of the second asymmetric voltage waveform during the voltage level increasing portion of the second asymmetric voltage waveform and applying the drive signal to the electromechanical converting element to generate an inertia force in the inertia member and cause the moving member to move;

a setting unit for setting a same amount of movement for moving the moving member with respect to the first and second asymmetric voltage waveforms of the drive signal; and a detection unit for detecting the actual amount of movement of the moving member with respect to the first and second asymmetric voltage waveforms of the drive signal, wherein the drive signal control unit controls the voltage level of the second asymmetric voltage waveform in accordance with the amount of movement set by the setting unit and the actual amount of movement detected by the detection unit for the first asymmetric voltage waveform, to eliminate differences between the amount of movement set by the setting unit and the actual amount of movement detected by the detection unit for the second asymmetric voltage waveform.

19. An actuator as in claim 18, wherein, in addition to controlling the voltage level of the second asymmetric voltage waveform during the voltage level increasing portion of the second asymmetric voltage waveform, the drive signal control unit controls the amount of time of the voltage level increasing portion of the second asymmetric voltage waveform.

20. An actuator as in claim 18, wherein the second asymmetric voltage waveform has a voltage level decreasing portion in which the voltage level of the second asymmetric voltage waveform is decreasing, the rate of voltage level increase of the voltage level increasing portion of the second asymmetric voltage waveform being larger than the rate of voltage level decrease of the voltage level decreasing portion of the second asymmetric voltage waveform.

21. An actuator comprising:

an electromechanical converting element having a first connection portion and a second connection portion;

a mass member connected to the first connection portion of the electromechanical converting element;

a moving member connected to the second connection portion of the electromechanical converting element, and which moves by receiving a reaction force of the mass member when the electromechanical converting element expands or contracts;

a relative moving member contacting the moving member and producing a relative motion with respect to the moving member from movement of the moving member; and a drive control unit which produces a first asymmetric voltage waveform and applies the first asymmetric voltage waveform to the electromechanical converting element to cause the moving member to receive a reaction force of the mass member and thereby move in response to the applied first asymmetric voltage waveform, produces a second asymmetric voltage waveform which is not contiguous with the first asymmetric voltage waveform and applies the second asymmetric voltage waveform, after the first asymmetric voltage waveform, to the electromechanical converting element to cause the moving member to receive a reaction force of the mass member and thereby move in response to the applied second asymmetric voltage waveform, and controls the second asymmetric voltage waveform in accordance with an actual amount of movement of the moving member caused by the first asymmetric voltage waveform.

* * * * *

UNITED STATES PATENT AND TRADEMARK OFFICE
CERTIFICATE OF CORRECTION

PATENT NO.: 5,869,918
DATED : February 9, 1999
INVENTOR(S): Takatoshi Ashizawa

It is certified that error appears in the above-identified patent and that said Letters Patent is hereby corrected as shown below:

Column 14, line 36, (claim 16), change "continuous" to --contiguous--.

Column 15, line 13, (claim 18), change "continuous" to --contiguous--.

Signed and Sealed this

First Day of June, 1999

Attest:

Attesting Officer

Q. TODD DICKINSON

Acting Commissioner of Patents and Trademarks